(12) United States Patent
Benson et al.

(10) Patent No.: US 9,739,125 B2
(45) Date of Patent: Aug. 22, 2017

(54) METHOD FOR UPGRADING IN SITU HEAVY OIL

(71) Applicant: Chevron U.S.A. Inc., San Ramon, CA (US)

(72) Inventors: Ian Phillip Benson, The Woodlands, TX (US); Cesar Francisco Ovalles, Walnut Creek, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/972,361

(22) Filed: Dec. 17, 2015

(65) Prior Publication Data

US 2016/0177691 A1    Jun. 23, 2016

Related U.S. Application Data

(60) Provisional application No. 62/093,627, filed on Dec. 18, 2014.

(51) Int. Cl.
*E21B 43/24* (2006.01)
*C09K 8/592* (2006.01)

(52) U.S. Cl.
CPC .......... *E21B 43/2406* (2013.01); *C09K 8/592* (2013.01)

(58) Field of Classification Search
None
See application file for complete search history.

(56) References Cited

U.S. PATENT DOCUMENTS

| | | | | |
|---|---|---|---|---|
| 3,945,435 A * | 3/1976 | Barry | ...................... | E21B 43/16 166/267 |
| 4,513,819 A * | 4/1985 | Islip | ........................ | E21B 43/18 166/272.3 |
| 4,697,642 A * | 10/1987 | Vogel | ...................... | E21B 43/40 166/266 |
| 5,899,274 A | 5/1999 | Frauenfeld et al. | | |
| 6,186,232 B1 | 2/2001 | Isaacs et al. | | |
| 6,230,814 B1 * | 5/2001 | Nasr | ...................... | C09K 8/592 166/263 |
| 6,357,526 B1 * | 3/2002 | Abdel-Halim | ....... | C10G 21/003 166/267 |

(Continued)

FOREIGN PATENT DOCUMENTS

| CA | 2155035 A1 | 4/1992 |
|---|---|---|
| CA | 2299790 A1 | 8/2001 |

(Continued)

OTHER PUBLICATIONS

Mukhametshina; Reducing the Environmental Impact of Bitumen Extraction; Dec. 2013; 85 Pages.*

(Continued)

*Primary Examiner* — Anuradha Ahuja (57) ABSTRACT

A method is provided for producing upgraded heavy oil from a subterranean reservoir by producing a steam chamber within the reservoir by the action of steam and flowing a liquid phase additive into a near wellbore region of the steam chamber to control asphaltenes mobility within the near wellbore region. Build-up of asphaltenes, which derive from the heavy oil, in the near wellbore region has the potential of affecting heavy oil production rates from the reservoir. The additive is formulated to mobilize the asphaltenes within this region.

18 Claims, 1 Drawing Sheet

(56) References Cited

U.S. PATENT DOCUMENTS

| | | | |
|---|---|---|---|
| 6,662,872 B2* | 12/2003 | Gutek | E21B 43/168 166/263 |
| 6,708,759 B2* | 3/2004 | Leaute | E21B 43/24 166/263 |
| 6,769,486 B2 | 8/2004 | Lim et al. | |
| 7,363,973 B2 | 4/2008 | Nenniger et al. | |
| 7,392,846 B2 | 7/2008 | Perez | |
| 7,717,175 B2* | 5/2010 | Chung | E21B 43/16 166/263 |
| 8,695,707 B2 | 4/2014 | Li et al. | |
| 2003/0000711 A1* | 1/2003 | Gutek | E21B 43/168 166/402 |
| 2003/0062159 A1 | 4/2003 | Nasr | |
| 2005/0211434 A1* | 9/2005 | Gates | C09K 8/592 166/272.3 |
| 2007/0181299 A1* | 8/2007 | Chung | E21B 43/16 166/245 |
| 2007/0199698 A1 | 8/2007 | Hocking | |
| 2007/0199699 A1 | 8/2007 | Hocking | |
| 2007/0295640 A1* | 12/2007 | Tan | C09K 8/524 208/22 |
| 2008/0017372 A1* | 1/2008 | Gates | E21B 43/16 166/254.1 |
| 2010/0078163 A1* | 4/2010 | Banerjee | E21B 43/2408 166/248 |
| 2010/0130386 A1* | 5/2010 | Chakrabarty | C10G 1/04 507/103 |
| 2010/0155062 A1 | 6/2010 | Boone et al. | |
| 2010/0276140 A1* | 11/2010 | Edmunds | E21B 43/2408 166/272.3 |
| 2011/0017455 A1* | 1/2011 | Duong | E21B 43/2406 166/303 |
| 2011/0120709 A1* | 5/2011 | Nasr | C09K 8/592 166/272.3 |
| 2011/0120710 A1* | 5/2011 | Dong | E21B 43/2408 166/272.3 |
| 2011/0186295 A1* | 8/2011 | Kaminsky | E21B 43/24 166/302 |
| 2011/0232903 A1* | 9/2011 | Dreher, Jr. | E21B 43/305 166/270 |
| 2011/0272152 A1* | 11/2011 | Kaminsky | E21B 43/30 166/268 |
| 2011/0272153 A1* | 11/2011 | Boone | E21B 43/26 166/270 |
| 2012/0241150 A1* | 9/2012 | Al Yahyai | E21B 43/14 166/270 |
| 2012/0247760 A1* | 10/2012 | Wheeler | E21B 43/2406 166/272.3 |
| 2012/0273195 A1* | 11/2012 | Wheeler | E21B 43/2408 166/272.3 |
| 2012/0305264 A1* | 12/2012 | Chakrabarty | G01N 33/2823 166/369 |
| 2013/0045902 A1* | 2/2013 | Thompson | C09K 8/58 507/261 |
| 2013/0118737 A1* | 5/2013 | Schneider | E21B 43/2406 166/272.3 |
| 2013/0153216 A1* | 6/2013 | Scott | E21B 43/2406 166/254.1 |
| 2013/0199779 A1* | 8/2013 | Scott | E21B 43/2406 166/268 |
| 2014/0144621 A1 | 5/2014 | Rout | |
| 2014/0144627 A1* | 5/2014 | Salazar Hernandez | E21B 43/2408 166/272.4 |
| 2014/0166280 A1* | 6/2014 | Stone | E21B 43/12 166/268 |
| 2014/0305639 A1 | 10/2014 | Johnsen et al. | |
| 2014/0332212 A1* | 11/2014 | Ayers | C09K 8/584 166/279 |

FOREIGN PATENT DOCUMENTS

| | | |
|---|---|---|
| CA | 2633061 A1 | 8/2001 |
| CA | 2778135 A1 | 11/2012 |

OTHER PUBLICATIONS

Al-Murayri; Experimental Investigation of Expanding Solvent Steam Assisted Gravity Drainage Using Multicomponent Solvents; Dec. 2012; 261 Pages.*
Material Safety Data Sheet; Naphthalene MSDS; Sciencelab.com; Oct. 2005; pp. 1-6.*
Ali, Syed A., et al.; "Case Study: Using CT-Deployed Scale Removal to Enhance Production in Duri Steam Flood, Indonesia"; SPE 74850, Apr. 2002, pp. 1-12.
Ali, Syed A., et al.; "Effective Stimulation of High-Temperature Sandstone Formations in East Venezuela With a New Sandstone-Acidizing System"; SPE 98318, Feb. 2006, pp. 1-11.
Brand, S.; "Results From Acid Stimulation in Lloydminster SAGD Applications"; SPE 126311, Feb. 2010, pp. 1-10.
Erno, B.P., et al.; "Carbonate Scale Formation in Thermally Stimulated Heavy-Oil Wells Near Lloydminster, Saskatchewan"; SPE 21548, Feb. 1991, pp. 229-238 (and 2 pages of drawings).
Henderson, Greg J., et al.; "Stimulation of High-Temperature Sandstone Wells in Steam Drive and SAGD Areas"; SPE 84161, Oct. 2003, pp. 1-9.
Kelland, Malcolm A.; "Production Chemicals for the Oil and Gas Industry", CRC Press, 2009, Chapter 4, "Asphaltene Control", pp. 111-148.
Martin, A.N.; "Stimulating Sandstone Formations with non-HF Treatment Systems"; SPE 90774, Sep. 2004, pp. 1-10.
Uchendu, Chike, et al.; "Solvent/Acid Blend Provides Economic Single Step Matrix Acidizing Success for Fines and Organic Damage Removal in Sandstone Reservoirs: A Niger-Delta Case Study"; SPE 90798, Sep. 2004, pp. 1-11.
Van Domelen, Mary S., et al.; "Alternate Acid Blends for HPHT Applications"; SPE 30419, Sep. 1995, pp. 523-530.
Boyle, T.B., et al.; "The Evolution of SAGD Technology at East Senlac"; Paper 2002-300, Journal of Canadian Petroleum Technology, Jan. 2003, vol. 42, No. 1, pp. 58-61.
Cortes, Farid B., et al.; "Sorption of Asphaltenes Onto Nanoparticles of Nickel Oxide Supported on Nanoparticulated Silica Gel"; Energy Fuels, Feb. 2012, vol. 26, pp. 1725-1730.
Das, S.K, et al.; "Effect of Asphaltene Deposition on the Vapex Process: A Preliminary Investigation Using a Hele-Shaw Cell"; Journal of Canadian Petroleum Technology, Jun. 1994, vol. 33, No. 6, pp. 39-45.
Franco, Camilo, et al.; "Nanoparticles for Inhibition of Asphaltenes Damage: Adsorption Study and Displacement Test on Porous Media"; Energy Fuels, Apr. 2013, vol. 27, pp. 2899-2907.
Garnett, R.L., et al.; "Recovery of Heavy Oil From the Monterey Formation in Offshore California by Cyclic Injection of Light Oil Diluent"; SPE 54082, Mar. 1999, pp. 1-11.
Gupta, S.C., et al.; "Christina Lake Solvent Aided Process Pilot"; Sep. 2006, vol. 45, No. 9, pp. 15-18.
Gupta, S., et al.; "Field Implementation of Solvent Aided Process"; Paper 2002-299, Petroleum Society Canadian Institute of Mining, Metallurgy & Petroleum, Jun. 2002, pp. 1-13.
Gupta, S., et al.; "Insights Into Some Key Issues With Solvent Aided Process"; Journal of Canadian Petroleum Technology, Feb. 2003, vol. 42, No. 2, pp. 54-61.
Haghighat, P., et al.; "Role of Asphaltene Precipitation in VAPEX Process"; Journal of Canadian Petroleum Technology, Mar. 2010, vol. 49, No. 3, pp. 14-21.
Hashemi, R., et al.; "Experimental Study of Simultaneous Athabasca Bitumen Recovery and Upgrading Using Ultradispersed Catalysts Injection"; CSUG/SPE 149257, Nov. 2011, pp. 1-13.
Salazar, A., et al.; "Simulation of Field Results of Cyclic Steam/Gas Injection in the Bolivar Coast, Western Venezuela"; SPE 16732, Sep. 1987, pp. 377-385.
Shokrlu, Y. Hamedi, et al.; "In-Situ Upgrading of Heavy Oil/Bitumen During Steam Injection by Use of Metal Nanoparticles: A (56) References Cited

OTHER PUBLICATIONS

Study on In-Situ Catalysis and Catalyst Transportation"; Aug. 2013, SPE Reservoir Evaluation & Engineering, pp. 333-344.
Wu, Chuan, et al.; "In Situ Upgrading Extra-Heavy Oil by Catalytic Aquathermolysis Treatment Using a New Catalyst Based Anamphiphilic Molybdenum Chelate"; SPE 130333, Jun. 2010, pp. 1-9.
Yakubov, M.R., et al.; "Asphaltene Precipitation Inhibitors and Phase Behaviour Control for Bitumen Recovery by Solvent Injection"; SPE-170165-MS, Jun. 2014, pp. 1-6.
Zhang, Zhiyong, et al.; "Experimental Study of In-Situ Upgrading for Heavy Oil Using Hydrogen Donors and Catalyst Under Steam Injection Condition"; SPE 157981, Jun. 2012, pp. 1-7.
Hashemi, Rohallah, et al.; "Nanoparticle Technology for Heavy Oil In-Situ Upgrading and Recovery Enhancement: Opportunities and Challenges"; Applied Energy, 2014, vol. 133, pp. 374-387.
Kar, Taniya, et al.; The Impact of Asphaltene Precipitation and Clay Migration on Wettability Alteration for Steam Assisted Gravity Drainage (SAGD) and Expanding Solvent-SSGD (ES-SAGD), SPE 174439-MS, Jun. 2015, pp. 1-13.
Lau, E.C., et al.; "Optimization of the SAGD+® Process Technology"; World Heavy Oil Congress 2014, New Orleans, Louisiana, pp. 1-18.
Leaute, Roland; "Liquid Addition to Steam for Enhancing Recovery (LASER) of Bitumen with CSS: Evolution of Technology from Research Concept of a Field Pilot at Cold Lake"; SPE/Petroleum Society of CIM/CHOA 79011, Nov. 2002, pp. 1-11.
Leaute, R.P.; "Liquid Addition to Steam for Enhancing Recovery (LASER) of Bitumen with CSS: Results from the First Pilot Cycle"; Journal of Canadian Petroleum Technology, Sep. 2007, vol. 46, No. 9, pp. 22-30.
Manrique, Eduardo, et al.; "Enhanced Oil Recovery Field Experiences in Carbonate Reservoirs in the United States"; $25^{th}$ Annual Workshop & Symposium, Collaborative Project on Enhanced Oil Recovery, International Energy Agency, Sep. 2004, no pages numbers indicated.
Mendez, Zuleyka, et al.; "Cyclic Steam Injection With Additives: Laboratory and Field Test Results of Steam/Foam and Steam/Solvent Processes"; SPE 24632, Oct. 1992, pp. 71-85.
Moreno, L., et al.; "Optimal Application Conditions of Solvent Injection into Oilsands to Minimize the Effect of Asphaltene Deposition: An Experimental Investigation"; SPE 165531, Jun. 2013, pp. 1-21.
Mukhametshina, Albina, et al.; "Asphaltene Precipitation During Bitumen Extraction with Expanding-Solvent Steam-Assisted Gravity Drainage: Effects on Pore-Scale Displacement"; SPE Journal, 2015, pp. 1-13.
Mukhametshina, A., et al.; "Bitumen Extraction by Expanding Solvent-Steam Assisted Gravity Drainage (ES-SAGD) with Asphaltene Solvents and Non-Solvents;" SPE-170013-MS, Jun. 2014, pp. 1-16.
Munroe, Norman (Principal Author); "Solvent Based Enhanced Oil Recovery for In-Situ Upgrading of Heavy Oil Sands"; Final Technical Report, submitted by Florida International University, Miami, FL, prepared for the United States Department of Energy, National Energy Technology Laboratory, Office of Fossil Energy, DOE Award No. DE-FG26-06NT42745, Oil & Natural Gas Technology, Jun. 2009, no pages numbers indicated.
Nares, H.R., et al.; "Upgrading Heavy and Extraheavy Crude Oil with Ionic Liquid"; SPE 108676, Jun. 2007, pp. 1-5.
Nasr, T.N, et al.; "New Hybrid Steam-Solvent Processes for the Recovery of Heavy Oil and Bitumen"; SPE 101717, Nov. 2006, pp. 1-17.
Nasr, T.N, et al.; "Novel Expanding Solvent-SAGD Process ES-SAGD"; Journal of Canadian Petroleum echnology, Jan. 2003, vol. 42, No. 1, pp. 13-16.

Ovalles, C., et al.; "Physical and Numerical Simulations of Subsurface Upgrading Using Solvent Deasphalting in a Heavy Crude Oil Reservoir"; SPE-174412-MS, Jun. 2015, pp. 1-18.
Pereira-Almao, Pedro, et al.; "An Integrated Approach to On Site/In Situ Upgrading"; $19^{th}$ World Petroleum Congress, Spain, 2008, no pages numbers provided (6 pages).
Nasr, T.N., et al.; "Novel Expanding Solvent-SAGD Process "ES-SAGD""; Journal of Canadian Petroleum Technology, Jan. 2003, vol. 42, No. 1, pp. 13-16.
Nasr, T.N., et al.; "Thermal Techniques for the Recovery of Heavy Oil and Bitumen"; SPE°97488, Dec. 2005, pp. 1-15.
Orr, Bryan; "ES-SAGD; Past, Present and Future"; SPE-129518-STU, Oct. 2009, pp. 1-16.
Yuan, J.-Y., et al.; "Impacts of Gas on SAGD: History Matching of Lab Scale Tests"; Journal of Canadian Petroleum Technology, Jan. 2006, vol. 45 No. 1, pp. 27-32.
Ardali, M., et al.; "Experimental Study of Co-Injection of Potential Solvents with Steam to Enhance SAGD Process"; SPE 144598, May 2011, pp. 1-14.
Boak, J., et al.; "Preliminary Numerical Analysis for a Naptha Co-Injection Test During SAGD"; Paper 2004-001, presented at the Petroleum Society's $5^{th}$ Canadian International Petroleum Conference ($55^{th}$ Annual Technical Meeting), Jun. 2004, pp. 1-15.
Boone, Thomas J., et al.; "An Integrated Technology Development Plan for Solvent-based Recovery of Heavy Oil"; SPE 150706, Dec. 2011, pp. 1-9.
Bracho, L.G., et al.; "Steam-Solvent Injection, Well LSJ-4057, Tia Juana Field, Western Venezuela"; SPE 21530, Feb. 1991, pp. 83-94.
Brand, S., et al.; "Results from Acid Stimulation in Lloydminster SAGD Applications"; SPE 126311, Feb. 2010, pp. 1-2.
Deng, X., et al.; "Simulating the ES-SAGD Process with Solvent Mixture in Athabasca Reservoirs"; Journal of Canadian Petroleum Technology, Jan. 2010, vol. 49, No. 1, pp. 38-46.
Edmunds, N., et al.; "Advanced Solvent-Additive Processes via Genetic Optimization"; Paper 2009-115, Proceedings of the Canadian International Petroleum Conference (CIPC), Jun. 2009, Calgary, Alberta, Canada, pp. 1-11.
Gates, Ian D.; "Oil Phase Viscosity Behaviour in Expanding-Solvent Steam-Assisted Gravity Drainage"; Journal of Petroleum Science and Engineering, Mar. 2007, vol. 59, pp. 123-134.
Gupta, S.C., et al.; "Christina Lake Solvent Aided Process Pilot"; Journal of Canadian Petroleum Technology, Sep. 2006, vol. 45, No. 9, pp. 15-18.
Gupta, S., et al.; "Field Implementation of Solvent Aided Process"; Journal of Canadian Petroleum Technology, Nov. 2005, vol. 44, No. 11, pp. 8-13.
Ivory, J., et al.; "Thermal Solvent Reflux and Thermal Solvent Hybrid Experiments"; Journal of Canadian Petroleum Technology, Feb. 2010, vol. 49, No. 2, pp. 23-31.
Jha, Raman K., et al.; "New Insights into Steam-Solvent Co-Injection Process Mechanism"; SPE°159277, Journal of Canadian Petroleum Technology, Oct. 2012, pp. 1-14.
Leaute, R.P., et al.; "Liquid Addition to Steam for Enhancing Recover), (Laser) of Bitumen with CSS: Results from the First Pilot Cycle"; Journal of Canadian Petroleum Technology, Sep. 2007, vol. 46, No. 9, pp. 22-30.
Li, Weiqiang, et al.; "Solvent-Type and -Ratio Impacts on Solvent-Aided SAGD Process"; SPE Reservoir Evaluation & Engineering, Jun. 2011, pp. 320-331.
McCormack, M.E.; "Design of Steam-Hexane Injection Wells for Gravity Drainage Systems"; Journal of Canadian Petroleum Technology, Jan. 2009, vol. 48, No. 1, pp. 22-28.
Mohebati, M. Hosseininejad, et al.; "Numerical-Simulation Investigation of the Effect of Heavy-Oil Viscosity on the Performance of Hydrocarbon Additives in SAGD"; SPE Reservoir Evaluation & Engineering, Apr. 2012, pp. 165-181.
Nasr, T.N., et al.; "New Hybrid Steam-Solvent Processes for the Recovery of Heavy Oil and Bitumen"; SPE 101717, Nov. 2006, pp. 1-17.

\* cited by examiner

METHOD FOR UPGRADING IN SITU HEAVY OIL

CROSS-REFERENCE TO RELATED APPLICATIONS

This application claims benefit under 35 USC 119 of U.S. Provisional Patent Application No. 62/093,627 with a filing date of Dec. 18, 2014, which is incorporated herein by reference in its entirety.

FIELD OF THE INVENTION

The present invention is directed to a method for enhancing production of heavy oil from a subterranean reservoir.

BACKGROUND

Bitumen production from thermal EOR operations continues to increase with time, with the use of solvent co-injection with steam to increase oil rates and reduce steam-oil ratios for SAGD (Steam Assisted Gravity Drainage) and CSS (Cyclic Steam Stimulation) operations. Encouraging results from several field tests suggest that this enhancement to the steam-only operations will one day become commonplace.

Operators may experience asphaltene deposition in co-injection operations where light hydrocarbon solvents are used (e.g. propane, butane, pentane, etc.). Use of these light hydrocarbons within the reservoir may cause asphaltene molecules to separate from heavy oils, which is advantageous to selectively increase the amount of higher API oil produced from the reservoir while delaying or preventing the production of undesired asphaltenes on the surface. Field trials using propane and butane for in situ deasphalting to increase the API gravity during heavy oil production have been reported.

There is a need for an improved method to address the effect of asphaltenic materials in the production of heavy oil with the use of volatile solvents.

SUMMARY

The present invention is directed to a method for enhanced oil recovery. The method includes recovering heavy oil from a steam chamber in a subterranean reservoir, the steam chamber having been formed by steam injection into the reservoir, by provision of a liquid phase additive to the steam chamber. Accordingly, in one embodiment, the method includes injecting steam into a subterranean reservoir, generating a steam chamber and mobilizing a first heavy oil therein; injecting steam and an additive into the steam chamber at a predetermined steam injection temperature and a predetermined steam injection pressure to maintain the steam as vapor and the additive as a liquid; and producing a second heavy oil from the reservoir.

In a further embodiment, therefore, the method includes providing a subterranean reservoir containing heavy oil; providing a production wellbore containing a production tubing and an injection wellbore spaced-apart from the production wellbore a predetermined elevation and containing an injection tubing; injecting steam into the subterranean reservoir and generating a steam chamber in the reservoir, such that the injection tubing is in fluid communication with the production tubing within the steam chamber and producing a heavy oil; and injecting steam into the steam chamber at a predetermined steam injection temperature and at a predetermined steam injection pressure and providing a liquid phase additive to the steam chamber for mobilizing asphaltenes in a near wellbore region of the steam chamber.

In one embodiment, over 90 wt. % of the additive remains in the liquid phase in the steam chamber at the predetermined steam injection pressure and the predetermined steam injection temperature. In one embodiment, the steam injection at the predetermined steam injection temperature and at the predetermined steam injection pressure and the injection of the liquid phase additive occur concurrently or sequentially. In one embodiment, the steam injection occurs before the injection of the liquid phase additive. In one embodiment, the liquid phase additive has an initial boiling point that is higher than the predetermined steam injection temperature at the predetermined steam injection pressure.

The liquid phase additive serves to interact with asphaltenes in the steam chamber and mobilizes them for fluid production from the chamber. The additive serves to mobilize asphaltenes that have been deposited in a near wellbore region of the steam chamber. The additive serves to increase the mobility of asphaltenes that are in solution in the heavy oil, and thus reduce the chance of asphaltene deposition in the near wellbore region. The additive serves to maintain the permeability for fluid flow in the near wellbore region. The additive serves to limit steam short circuiting the steam chamber and flowing as a vapor directly into production tubing from injection tubing. By providing one or more of these enhancements, the additive serves to maintain high heavy oil production rates from the chamber.

The steam chamber may be heated using steam in combination with continuous provision of additive to the chamber, periodic provision of additive, or provision of additive as needed to maintain a desired heavy oil production rate.

The steam chamber may further be heated using steam at a steam injection temperature and a steam injection pressure in combination with a light solvent. If used, the light solvent is selected to decrease the viscosity of heavy oil in the steam chamber, and to increase the precipitation of asphaltenes that are naturally in the heavy oil, causing those asphaltenes to deposit in the steam chamber. Accordingly, an example method of the invention for enhancing oil recovery includes providing a subterranean reservoir containing heavy oil; providing a production wellbore containing a production tubing and an injection wellbore spaced-apart from the production wellbore a predetermined elevation and containing an injection tubing; injecting steam into the subterranean reservoir and generating a steam chamber in the reservoir, such that the injection tubing is in fluid communication with the production tubing within the steam chamber and producing a first heavy oil having a first asphaltene content; injecting a light solvent vapor and steam into the steam chamber at a predetermined steam injection temperature and at a predetermined steam injection pressure and producing a second heavy oil having a second asphaltene content that is lower than the first asphaltene content of the first heavy oil; and providing a liquid phase additive to the steam chamber for mobilizing asphaltenes in a near wellbore region of the steam chamber.

DETAILED DESCRIPTION

The following terms will be used throughout the specification and will have the following meanings unless otherwise indicated.

"Subterranean reservoir" is synonymous with "subsurface reservoir" and "geological reservoir".

"Reservoir" refers to a geological formation or structure that contains heavy oil.

"Carbon number" represents a hydrocarbon molecule, and gives the total number of carbon atoms in the molecule. C4 represents hydrocarbon molecules having 4 carbon atoms per molecule. Mixtures of hydrocarbons containing more than one hydrocarbon molecule are treated similarly. Thus, "C5-hydrocarbons" represents a molecular mixture having 5 or fewer carbon atoms per molecule; "C1-C5 hydrocarbons" represents a molecular mixture having from 1 to 5 carbon atoms per molecule. Methane, ethane, propane, butane, pentane and their branched, cyclic, and olefinic analogs, and mixtures thereof are examples of C5-hydrocarbons. Specified mixtures of hydrocarbons, as used herein, may include impurity amounts (e.g. less than 10%) of higher (and lower) carbon number materials.

"Near wellbore region" refers to a region of the subterranean reservoir adjacent to and encompassing a length of the injection and a length of the production wellbores within the steam chamber. With regard to the injection tubing, the near wellbore region is generally centered on the location along the injection tubing through which steam is injected into the reservoir. With regard to the production tubing, the near wellbore region is generally centered on the location along the tubing string through which fluids pass into the production tubing.

"Modified pressure differential" refers in general to the pressure differential between an injection tubing string and a production tubing string within the steam chamber. During generation of the steam chamber, involving steam injection alone at a given steam injection rate, the pressure drop between the injection and production tubing strings remains approximately constant, and is taken to be a "base pressure differential". During production of the upgraded heavy oil, with asphaltene deposition from the heavy oil and into the steam chamber, the pressure differential may increase above the base differential. The difference between the instant pressure differential and the base pressure differential is taken to be the "modified pressure differential".

"Heavy oil" refers to crude oils having an API gravity of less than 22°. In one embodiment, the term "heavy oil" refers to "bitumen" and "extra-heavy oil" having an API gravity of less than 10°.

"Upgraded heavy oil" refers to heavy oil that has been treated to contain a lesser amount of asphaltenes than the heavy oil from which it is derived.

"Conformance device" refers to a device or structural element associated with or built into injection tubing that provides a desired distribution of one or more fluids (e.g. liquid, vapor, or a combination) into the reservoir. One objective for use of a conformance device is to achieve a near-uniform distribution of fluids into the formation, along a particular length of the injection tubing. The profile of injected fluid from the conformance device may also be tailored such that a maximum amount of the fluid may be injected in a particular selected region of the reservoir. One fluid or a combination of fluids may be injected into the formation through a single conformance device. A single conformance device, or multiple conformance devices, may be employed in a reservoir, in the creation and maintenance of a single or multiple steam chambers within the reservoir.

"Steam chamber" is synonymous with the term "steam chest", and represents a heated region of reservoir due to steam injection into the reservoir.

"Mobilized" refers to putting into movement or circulation. Asphaltenes are mobilized by dissolving or dispersing them into a liquid phase, or by melting them by the action of heat. Mobilized can also include the mechanism of heavy oil or asphaltene viscosity reduction by action of heat. For example, as discussed further herein, the heavy oil viscosity within the steam chamber is reduced, and heavy oil flows by gravity drainage into the production tubing.

Figure 1:
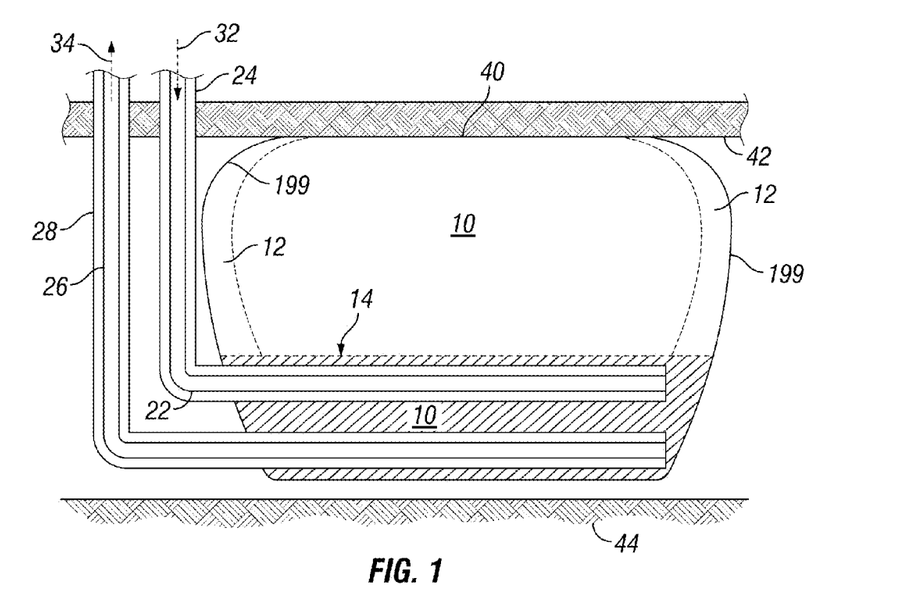
FIG. 1 illustrates a graphical representation of the subterranean reservoir during recovery of heavy oil.
Figure 2:
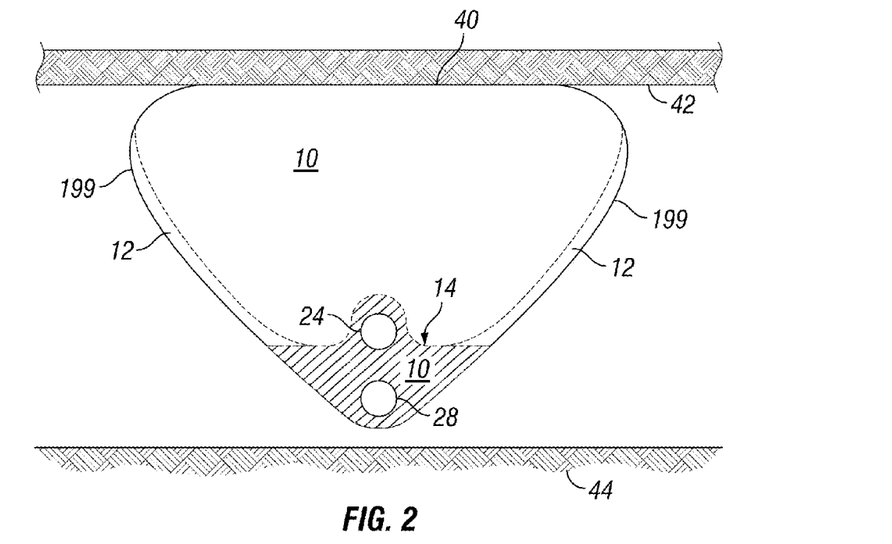
FIG. 2 illustrates another graphical representation of the subterranean reservoir during recovery of heavy oil.

The method of the invention may be understood with reference to the embodiments illustrated in FIGS. 1-2. In FIGS. 1-2, a steam chamber 10 has been formed in an oil sand reservoir 40 that contains heavy oil. The oil containing reservoir 40 is situated between a cap rock/overburden 42 above and an underburden 44 beneath the reservoir 40.

An example subterranean reservoir 40 may be a sandstone or shale reservoir, or bitumen bearing oil sands. The sandstone may be mainly fine to very fine grained quartz with about 5% clay content. A typical bitumen bearing oil sand has a permeability of greater than 1 Darcy, and generally in a range from 2 to 15 Darcy, a porosity of greater than 20%, and in one embodiment of greater than 30%, a natural reservoir temperature in a range from 1°-50° C., and in one embodiment in a range from 1°-25° C., and a natural reservoir pressure of in a range from 350-14,000 kPa (50-2000 psi), and in one embodiment in a range from 350-7000 kPa (50-1000 psi).

Access to the heavy oil in the reservoir 40 is through one or more wellbores 24 and 28. Each wellbore may be supplied with one or more injection tubing strings 22 and/or one or more production tubing strings 26. In the embodiments illustrated in FIGS. 1-2, the method includes providing a subterranean reservoir 40 containing heavy oil, an injection wellbore 24 containing an injection tubing string 22 and a production wellbore 28 spaced-apart from the injection wellbore 24 a predetermined distance D and containing a production tubing string 26. The injection tubing string 22 provides injection fluid 32 to the reservoir 40 for enhanced oil production, and the production tubing string 26 is provided for recovering produced fluids 34 from the reservoir 40. The production wellbore 28 may be equipped with an artificial lift system or method including, but not limited to, gas lift, electric submersible pump (ESP), progressing cavity pump, rod pump, or steam lift. While the embodiments shown in FIGS. 1-2 illustrate an injection tubing string 22 and a production tubing string 26 in different wellbores, they may be included along part of a length in a single wellbore, and may be positioned at any angle ranging from vertical to horizontal. The reservoir that contains the heavy oil may be newly accessed for the production of upgraded heavy oil through one or more wellbores drilled for injecting fluids into the reservoir and for producing upgraded heavy oil therefrom. Alternatively, the one or more wellbores may be pre-existing, and retrofitted for producing the heavy oil. In the embodiments illustrated in FIGS. 1-2, a steam chamber 10 has been formed in the reservoir 40; a horizontal section of the production tubing string 26 and a horizontal section of the injection tubing string 22 pass through the steam chamber 10. The injection tubing string 22 is at a predetermined elevation D above the production tubing string (e.g. with an elevation in the range from 1 meter to 30 meters above the production tubing string).

In embodiments, one or more of the following completion types may be used in the practice of the method: single or multiple tubing strings; slotted liners, screens, open hole, perforated casing, permeable sand-control media, casing-based passive or active flow distribution devices; one or more steam injection tubing strings which are, optionally, equipped with active or passive flow distribution devices; completions that optionally include sealing and non-sealing downhole isolation devices (e.g., packers, packers with holes for control lines, etc.); completions with downhole mixing devices to improve steam or fluid distribution inside or outside of the steam injector tubing strings; or completions optionally with downhole measurement devices (e.g., fiber optics, pressure sensors, etc.).

Steam Chamber: The heavy oil production may be initiated by circulating steam to the reservoir, often through both injection 22 and production 26 tubing strings, for a period of 1 day to 6 months to heat the near wellbore region, form the steam chamber 10 and mobilize heavy oil contained therein. Once a steam chamber is formed, steam is provided to the steam chamber through the injection tubing string 22; production fluids from the reservoir are recovered through production tubing string 26. The temperature within the steam chamber 10 approaches, or is approximately equal to, the steam injection temperature, and the pressure is equal to or above reservoir pressure. Due to the action of steam, the heavy oil viscosity within the steam chamber is reduced, and heavy oil flows by gravity drainage into the production tubing string 22. The heavy oil that is produced during formation of the steam chamber prior to heating is a highly viscous liquid or solid carbonaceous material, with a viscosity of greater than about 100 centipoise (cP) at reservoir conditions, and an asphaltene content of greater than 5 wt. %, and in some cases in a range from 10 wt. % to 40 wt. %.

Steam/Light Solvent: In one embodiment, a light solvent is combined with steam and injected into the formed steam chamber for improving the heavy oil production rate and for generating upgraded heavy oil having reduced asphaltene content. When co-injected with a small quantity of the light hydrocarbons, the temperature of steam keeps the hydrocarbons in their vapor state through the steam chamber 10 and to the chamber wall 199.

A condensing region 12 at the steam chamber wall 199 forms within and generally around the perimeter of the steam chamber 10. The steam chamber wall 199 is the outer edge of the condensing region 12. In the condensing region 12, steam and light solvent condense to form liquids, with the condensing vapors yielding their thermal energy to the heavy oil and the liquid phase light solvent interacting with the heavy oil in the condensing region, reducing its viscosity and causing the asphaltenes in the heavy oil to precipitate and remain in the steam chamber. The resulting upgraded heavy oil flows by gravity flow in a SAGD (steam-assisted gravity drainage) process to below the steam-liquid interface 14 and then into the production tubing string 26 of production wellbore 28. Upgrading the heavy oil by removing asphaltenes and depositing the asphaltenes in the steam chamber 10 of the reservoir is desirable for increasing the value of the heavy oil produced from the reservoir, and for decreasing the amount of solvent required to blend with the produced oil to facilitate transportation.

The light solvent has a boiling point below the steam injection temperature at steam chamber pressure. The light solvent typically includes C10-hydrocarbons (i.e., C1-C10). Light solvent toward the lower end of the C10-molecular range is particularly effective in decreasing the solubility of asphaltenes in the heavy oil, contributing to a higher degree of heavy oil upgrading. In embodiments, at least 80 wt. %, or at least 90 wt. %, of the light solvent is C5-hydrocarbons. In some applications, it may not be practical to include methane and ethane in the light solvent. Thus, in other embodiments, at least 80 wt. %, or at least 90 wt. %, of the light solvent is C3-C5 hydrocarbons (i.e. including propane, butane, pentane, their branched analogs, and mixtures thereof). The relative amounts of the C5-hydrocarbons in the light solvent may be adjusted to achieve the desired boiling point or the desired solvation properties with respect to the heavy oil, or the desired upgrading properties with respect to precipitation of asphaltenes from the heavy oil during heavy oil production.

The light solvent may be insoluble, partially soluble or fully soluble in heavy oil. Partially soluble or insoluble solvents may be separated from produced heavy oil using a two-phase separation scheme. Soluble solvents may be separated from produced oil by, for example, fractional distillation. Stabilization of the heavy oil to remove volatiles, including light solvent, may be conducted at the wellhead or in a downstream handling facility, including a refinery.

Steam Chamber Conditions: Steam and light solvent are injected into the steam chamber at conditions to maintain both steam and light solvent as vapors within the steam chamber. The steam injection temperature within the steam chamber is typically maintained in a range from 100-500° C.; in one embodiment, in a range from 150-400° C.; in another embodiment, in a range from 200-350° C. The steam injection pressure within the steam chamber is generally above atmospheric pressure; in one embodiment, the pressure is greater than 350 kPa (50 psi); in another embodiment, in a range from 350-14,000 kPa; (50-2,000 psi); in another embodiment, in a range from 350-7,000 kPa (50-1,000 psi).

An example set of steam injection conditions includes a steam injection temperature in a range from 150°-400° C. and a steam injection pressure in a range from 350-14,000 kPa. Another example set of conditions includes a steam injection temperature in a range from 200°-350° C. and a steam injection pressure in a range from 350-7,000 kPa.

Upgraded Heavy Oil: Upgraded heavy oil produced during the steam/light solvent injection has improved properties that permit production and recovery without the handling difficulties related to unstable asphaltenes present in conventional heavy oil. In one embodiment, the upgraded heavy oil contains less than 5 wt. % asphaltenes; in another, in a range from 0.1 wt. % to 4 wt. % asphaltenes. In one embodiment, the upgraded heavy oil contains less than 95 wt. % of the asphaltene content of the heavy oil prior to upgrading, in another, less than 90 wt. %, of the asphaltene content of the heavy oil. In one embodiment, the upgraded heavy oil has an API gravity that is at least 2 API numbers higher than the heavy oil prior to upgrading. To illustrate, upgraded heavy oil having an API gravity of 11° has an API gravity that is at least 2 API numbers higher than heavy oil prior to upgrading having an API gravity of 9°.

Asphaltenes: Asphaltenes may be characterized as a fraction of crude oil or heavy oil that is insoluble in paraffins (e.g., pentane) and soluble in aromatics (e.g. xylene).

In a developed steam chamber, a near wellbore region is defined to be relatively closer to the injection and production tubing strings and a far wellbore region is defined to be relatively more distant from the injection and production tubing strings. In the far wellbore region of the reservoir, asphaltene precipitation and deposition in the reservoir has a negligible effect on heavy oil production from the region; indeed, removing asphaltenes improves the quality of the upgraded heavy oil. In the near wellbore region, high amounts of asphaltene precipitation and deposition may having the effect of reducing the permeability of the near wellbore region, and reducing the upgraded heavy oil flow to the production tubing string.

Additive: To compensate for the precipitated asphaltenes in the near wellbore region, a liquid phase additive is flowed into the steam chamber for selectively mobilizing and removing asphaltenes that have accumulated in the near wellbore region. Mobilizing the asphaltenes involves dissolving and/or dispersing asphaltenes, such that they will flow with the additive to the production tubing. At least a portion of the additive dilutes into the heavy oil draining into the near wellbore region to selectively remove asphaltenes from that region. In so doing, the additive removes blockages and improves uniformity of a steam/liquid interface along the well pair.

Additive may be delivered to the steam chamber in an injection tubing along with steam, or in a separate, dedicated tubing or coiled tubing string for delivering the additive to one or more points along the injection wellbore. These dedicated strings may incorporate conformance devices to improve the uniform delivery of inhibitor to the steam chamber. The additive may be injected into the steam chamber at a temperature in a range from 150°-400° C. and at a pressure in a range from 350-14,000 kPa.

By mobilizing the asphaltenes in the near wellbore region, the additive serves to reduce any modified pressure differential between the injection and production tubing strings and to increase heavy oil production from the steam chest and particularly from the near wellbore region. The additive also provides a liquid level in the near wellbore region to prevent steam from short circuiting the steam chamber and flowing as a vapor directly into the production tubing from the injection tubing.

The additive is a non-aqueous fluid that is flowed into the steam chamber as a liquid, and remains a liquid to a large extent within the near wellbore region. In one embodiment, over 90 wt. % of the additive remains in the liquid phase in the steam chamber at steam injection conditions during steam injection. In one embodiment, a sample of the additive may be taken at the surface before or around the time of injection to determine if the additive will stay at least a 90 wt. % in the liquid phase at the particular conditions of the steam chamber. For example, boiling point measurements could be made in a laboratory on the sample. The boiling point measurements may be made using one or more of the following tests: ASTM D2887 ("Standard Test Method for Boiling Range Distribution of Petroleum Fractions by Gas Chromatography"), ASTM D5399 ("Standard Test Method for Boiling Point Distribution of Hydrocarbon Solvents by Gas Chromatography"), ASTM D7169 ("Standard Test Method for Boiling Point Distribution of Samples with Residues Such as Crude Oils and Atmospheric and Vacuum Residues by High Temperature Gas Chromatography") or other similar test method known to those of ordinary skilled in the art. Calculations or estimates can be made based on the boiling point measurements to determine which percentage remains in the liquid phase in the steam chamber. At least a portion of the additive injected into the steam chamber remains in the near wellbore region, to mobilize the asphaltenes deposited therein. During the time of the additive addition, production fluids include heavy oil, vapor phase and condensed steam, and liquid phase additive containing mobilized asphaltenes. Condensed light solvent may also be present if applied, along with steam, to the steam chamber.

Base Fluid: The additive comprises a hydrocarbon base fluid, and optionally a minor amount of a dispersing agent (including mixtures of dispersing agents) for further dispersing asphaltenes in the base fluid and for inhibiting precipitation of asphaltenes from the base fluid. The base fluid has a boiling range selected to maintain the additive as a liquid at the temperature of the steam chamber, while selectively removing asphaltenes from the near wellbore region. In one embodiment, the base fluid has an initial boiling point (i.e. bubble point) that is equal to or greater than the steam injection temperature at the pressure within the steam chamber. Characteristic ranges for the base fluid initial boiling point include from 100-500° C.; from 150-400° C.; and from 200-350° C. The amount of vaporized base fluid will depend on the temperature, pressure and K-values of the steam and the light solvent in the steam. In one embodiment, over 90 wt. % of the additive remains in the liquid phase in the steam chamber at steam injection conditions during steam injection.

The base fluid is a heavy petroleum fraction, with less than 10 wt. %, and usually less than 5 wt. % C5-hydrocarbons. In one embodiment, the base fluid is derived from a heavy petroleum fraction that has been formed by one or more of the following petroleum upgrading processes: thermal cracking, heavy oil cracking, dehydrogenation, deasphalting, and hydrocracking. Deasphalting involves liquid-liquid extraction of a crude oil, usually using a paraffinic solvent such as propane, butane, or pentane. The heavier asphaltene fraction is precipitated from the liquid phase. The base fluid is recovered by heating the liquid phase to a moderate temperature (e.g. 50-90° C.). The remaining liquid phase has the properties making it useful as the base fluid for removing asphaltenes from the steam chamber.

In one embodiment, the base fluid is a jet fuel boiling range fraction. The term "jet fuel boiling range fraction" refers to hydrocarbons having a boiling range in a temperature range from 280° F. to 572° F. (138° C. to 300° C.). In one embodiment, the base fluid is a diesel fuel boiling range fraction. The term "diesel fuel boiling range fraction" refers to hydrocarbons having a boiling range in a temperature range from 250° F. to 1000° F. (121° C. to 538° C.). Boiling point properties as used herein are normal boiling point temperatures, based on ASTM D2887-08. The "boiling range" is the temperature range between the 5 vol. % boiling point temperature and the 95 vol. % boiling point temperature, inclusive of the end points, as measured by ASTM D2887-08 ("Standard Test Method for Boiling Range Distribution of Petroleum Fractions by Gas Chromatography"). Other base fluids may alternatively be used.

In one embodiment, hydrocarbons combined in the base fluid to reduce asphaltene precipitation in the reservoir are richly aromatic, containing in a range from 60-100 wt. % aromatics; in another embodiment, in a range from 80-100 wt. % aromatics. Suitable aromatics include compounds having one or more aromatic rings as well as alkyl chains or naphthenic rings attached thereto, so that over 90 wt. % of the additive remains in the liquid phase at steam injection conditions during steam injection. In one embodiment, the base fluid comprises a alkyl substituted di- or tri-ring aromatic compounds, including naphthalene, and dimethyl naphthalene, a four member ring aromatic compound, a five member ring aromatic compound, or combinations thereof, where the length of the alkyl chain can be methyl, ethyl, propyl, etc. Polar molecules such as cyclohexanone, N-2-methyl pyrrolidone, N-ethyl-2-pyrrolidone, and combination thereof are also suitable components of the additive.

Asphaltene Dispersant/Inhibitor: In one embodiment, the additive injected into the near wellbore region comprises an asphaltene dispersing agent. As used herein, the term "dispersing agent" refers to a dispersant that facilitates maintaining asphaltenes in solution. Some of the dispersing agents that are suitable for the method also serve as inhibitors to prevent asphaltene precipitation.

The asphaltene dispersing agents are active and thermally stable at steam injection conditions. Example asphaltene dispersants that may be used in the additive include: polyolefin amides, alkyl magnesium sulfonates, alkyl aryl succinyl/amines, alkyl aryl phosphonic acids, alkylated polycondensed aromatics (e.g., highly alkylated polycondensed aromatics), alkylaromatics (e.g., very low polarity alkylaromatics), alkylaryl sulfonic acids, phosphoric esters, phosphonocarboxylic acids, sarcosinates, ethercarboxylic acids, aminoalkylenecarboxylic acids, alkylphenol s, ethoxylates of alkylphenol s, imidazolines, alkylamide-imidazolines, alkylsuccinimides, alkylpyrrolidones, fatty acid amides, ethoxylates of fatty acid amides, fatty esters of polyhydric alcohols, ion-pair salts of imines and organic acids, and ionic liquids.

Regarding highly alkylated polycondensed aromatics, a highly alkylated polycondensed aromatic is an additive in which the aromatic rings have more than 3 alkyl substitutions. For example, a 1,3,5-trimethyl naphthalene is considered a highly alkylated polycondensed aromatics whereas the 1,4-dimethyl naphthalene is not. Those of ordinary skill in the art will appreciate that each molecule has different performance as additives. In some embodiments, highly alkylated polycondensed aromatics can comprise alkyphenol polyformaldehyde resins.

Regarding polarity of additives, additive polarity refers to the capacity of the additives to interact with the asphaltenes through dipole-dipole intermolecular forces so the asphaltenes are kept in solution and do not precipitate within the reservoir. There are various ways to determine the additive polarity. One method is the use of the solubility parameters as the intermolecular interactions involved during the additive-asphaltene cases are similar as those found during the solute-solvent cases. The method to measure solubility parameter as described herein is determined by the Hansen's methodology reported in Barton, A. F. M. Handbook of Solubility Parameters and Other Cohesion Parameters; CRC Pres Inc.: Boca Raton, Fla., p. 95 (1983), which is incorporated by reference in its entirety. Using this method, high polarity alkylaromatics can have a solubility parameter greater than 25 MPa$^{0.5}$ but no greater than about 30 MPa$^{0.5}$, whereas low polarity alkylaromatics can have a solubility parameter of at least 18 MPa$^{0.5}$, and whereas very low polarity alkylaromatics can have a solubility parameter greater than 15 MPa$^{0.5}$ but no greater than 18 MPa$^{0.5}$. In some embodiments, very low polarity alkylaromatics can comprise monoalkylphenol and/or dialkylphenols.

Thus, in one embodiment, the additive includes one or more dispersing agent selected from the group consisting of polyolefin amides, alkyl magnesium sulfonates, alkyl aryl succinyl/amines, alkyl aryl phosphonic acids, alkylated polycondensed aromatics (e.g., highly alkylated polycondensed aromatics), alkylaromatics (e.g., very low polarity alkylaromatics), alkylaryl sulfonic acids, phosphoric esters, phosphonocarboxylic acids, sarcosinates, ethercarboxylic acids, aminoalkylenecarboxylic acids, alkylphenol s, ethoxylates of alkylphenol s, imidazolines, alkylamide-imidazolines, alkyl succinimides, alkylpyrrolidones, fatty acid amides, ethoxylates of fatty acid amides, fatty esters of polyhydric alcohols, ion-pair salts of imines and organic acids, and ionic liquids.

An asphaltene inhibitor shifts the onset of asphaltene flocculation pressure, to prevent the aggregation of asphaltene molecules. Hence, it can move asphaltene precipitation and subsequent deposition out of the wellbore to a point in the production system where it can be dealt with more easily. Classes of polymeric surfactants that may be combined in the additive as an asphaltene inhibitor include: alkylphenol/aldehyde resins and similar sulphonated resins; polyolefin esters, amides, or imides with alkyl, alkylenephenyl, or alkylene-pyridyl functional groups; alkenyl/vinyl pyrrolidone copolymers; graft polymers of polyolefins with maleic anhydride or vinyl imidazole; hyperbranched polyester amides; lignosulfonates; and polyalkoxylated asphaltenes.

In operational practice, the dispersing agent may be mixed with the base fluid at extended intervals, with the concentration of dispersing agent being higher following addition of fresh dispersing agent to an additive supply tank, and decreasing over a period of days to months as the additive in the supply tank is topped up with fresh additive during use. While the amount of dispersing agent in the additive may vary considerably between supplies of fresh dispersing agent, an average dispersing agent content, when averaged over a period of at least one fresh addition cycle is generally between 1 and 30,000 ppm, and typically between 10 and 1000 ppm. An example average dispersing agent content in the additive is between 20 and 500 ppm. In some embodiments, the additive comprises a base fluid (e.g., a major amount of a base fluid) and at least one dispersing agent (e.g., a minor amount of at least one dispersing agent). For example, if the dispersing agent is injected with the base fluid, the base fluid may be at least 97% by mass and the at least one dispersing agent may be 3% or less by mass. Of note, a ppm can be equal to 1 g per Kg. Using this unit (ppm), 1% can be equal to 10000 ppm.

Emulsifier: In one embodiment, an additional emulsifier chemical is optionally added to the additive to improve the distribution of the additive with the steam and liquid water. Example emulsifiers include a polyalkoxylate block copolymer and ester derivatives, alkylphenol-aldehyde resin alkoxylates, and polyalkoxylates of polyols or glycidyl ethers. In one embodiment, "alkyl" is taken to refer to hexy, octyl, nonyl, decyl, dodecyl or hexadecyl derivatives. An average concentration of emulsifier in the additive is defined in the same manner as the dispersing agent. Thus, an average concentration of emulsifier, when averaged over a period of at least one fresh emulsifier addition cycle is between 1 and 30,000 ppm, and typically between 10 and 1000 ppm. An example average dispersing agent concentration in the additive is between 20 and 200 ppm.

Any or all of the dispersant, the inhibitor and the emulsifier may be injected into the steam chamber individually, or in combination with the additive and/or steam. Dispersing agent and/or emulsifier may be combined with the additive at or upstream of the wellhead, or below the wellhead within the injection tubing. A conformance device may be used to facilitate mixing and distribution.

Nano-Particles: In one embodiment, the liquid phase additive is formulated with nano-particles. The nano-particles will generally have a size of less than 100 μm. In one subembodiment, the nano-particles are included in the liquid phase additive for adsorbing asphaltenes from the heavy oil, from the liquid phase additive or from the steam chamber. The absorption process has the effect of mobilizing the asphaltenes.

In one subembodiment, the nano-particles are included as catalysts for further in-situ upgrading of the heavy oil. The nano-particle catalysts may have activity for reducing the molecular weight of heavy oil molecules by a cracking mechanism, and/or for reacting with heteroatoms and double bonds in the heavy oil to increase the usability of the heavy oil.

In one subembodiment, the nano-particles are included for reducing the viscosity of the heavy oil.

Prepare Tubing Strings and Optionally Install Artificial Lift System: The method includes providing a production wellbore containing a production tubing and an injection wellbore spaced-apart from the production wellbore a predetermined elevation and containing an injection tubing. Preparation steps may include installing one or more wellbores into the reservoir, installing one or more tubing strings into the wellbores, providing fluid access between the tubing strings and the reservoir, or retrofitting installed wellbores for use in the method. Optionally, an artificial lift system can be installed in production wellbore at the time the tubing string(s) are installed or retrofitted.

Create Steam Chamber: Heavy oil production may be initiated by circulating steam in both the production tubing string and the injection tubing string for a period of time to heat the near wellbore region and produce heavy oil from that region. A period of time within a range from 1 day to 6 months is generally sufficient to produce heavy oil from the near wellbore region.

Once fluid communication is established between the tubing strings, steam is injected at relatively higher rates from the injection tubing to form a steam chamber, and heavy oil is produced by gravity drainage along the edges of the chamber and into the lower production tubing.

Inject Steam and Light Solvent: During any period of steam injection, the light solvent may be included with the injected steam. Steam and vapor phase light solvent provide thermal energy to the steam chamber for maintaining the temperature within the steam chamber and for reducing the viscosity of the heavy oil. Steam injection in the presence of the light solvent may be continuous or intermittent. The steam injection temperature may be constant, or may vary over time as conditions change. Addition of light solvent to the injected steam may take place during any part of the heavy oil production process, from the initial steam injection at the start of developing the steam chamber, through completion of heavy oil production, or any part thereof.

Steam and light solvent may be injected into the steam chamber in combination from a single injection tubing or from individual injection tubing strings. If combined in a single injection tubing, the steam and light solvent may be combined at or upstream of the wellhead, or below the wellhead within the injection tubing. If within the injection tubing, a mixing device may be provided. For example, a conformance device may be used to facilitate mixing and distribution into the steam chamber.

The steam/light solvent mixture injected into the steam chamber includes up to 50 wt. % solvent. In one embodiment, the steam/light solvent mixture includes from 2-50 wt. % solvent; in another embodiment, from 4-20 wt. % solvent, based on the combined weight of steam and solvent injected.

Inject Liquid Phase Additive: Asphaltenes in heavy oil in the steam chamber can have detrimental effects on heavy oil production rates, whether a light solvent is used, or not used. The detrimental impact of asphaltenes depositing in the near wellbore region, including between the injection tubing string and the production tubing string, is addressed by addition of the additive to the steam chamber.

The following example embodiments illustrate different approaches to employing the additive.

In one embodiment, the production rate of upgraded heavy oil is monitored, during which time additive is supplied to the steam chamber at a rate between 0.01-3 wt. %, based on the injection rate of steam, light solvent (if any) and additive. When the upgraded heavy oil production rate decreases by more than 3 wt. %, the rate of additive addition is increased to a rate between 3-10 wt. % for at least a time until the production rate is restored to a desired level.

In another embodiment, a base pressure differential between the injection tubing and the production tubing is determined before provision of liquid phase additive (and light solvent) to the steam chamber. Liquid phase additive is provided to the steam chamber at a rate sufficient to maintain a pressure differential between the injection tubing and the production tubing of less than 1000 kPa higher than the base pressure differential. In an illustrative example, the pressure differential between an injection tubing and a production tubing within the steam chamber monitored, during which time additive is supplied to the steam chamber at a rate between 0.5-2.5 wt. %. When the pressure differential increases by at least 1000 kPa over the base pressure differential, the rate of additive addition is increased to a rate between 3-10 wt. %.

In another embodiment, a base pressure differential between the injection tubing and the production tubing is determined before provision of liquid phase additive (and light solvent) to the steam chamber. During injection of steam (and optionally light solvent), the pressure differential between an injection tubing and a production tubing within the steam chamber is monitored. When the pressure differential increases by at least 1000 kPa over the base pressure differential, additive is flowed into the near wellbore region of the steam chamber. In one embodiment, the additive is flowed at a rate within a range from 0.011 to 10 wt. %.

In another embodiment, a steam trap is provided for trapping produced water from the steam chamber, and the steam trap temperature is monitored, during which time additive is supplied to the steam chamber at a rate between 0.01-3 wt. %. When the steam trap temperature decreases to within 10° C. of the water vaporization temperature at the pressure of the steam chamber, the rate of additive addition is increased to a rate between 3-10 wt. %. Alternatively, the steam chamber is generally operated in the absence of additive and additive being flowed to the near wellbore region when the steam trap temperature decreases to within 10° C. of the water vaporization temperature at the pressure of the steam chamber. In one embodiment, the additive is flowed at a rate within a range from 0.01 to 10 wt. %.

In another embodiment, the estimated permeability of the near wellbore region is monitored during heavy oil production, during which time additive is supplied to the steam chamber at a rate between 0.01-2.5 wt. %. When the permeability decreases by greater than 10% over the base permeability, the rate of additive addition is increased to a rate between 3-10 wt. %. The permeability of the near wellbore region can be estimated using drawdown calculations, step-rate drawdown tests, or build-up tests, or other methods.

These examples include a low level dosage of the additive during periods before which asphaltenes begin to impact production rates. In other embodiments, heavy oil production is conducted without additive addition until production rates decrease, at which time additive addition begins as indicated.

In the method, liquid phase additive is supplied to the steam chamber to remove asphaltenes from the near wellbore region that may otherwise reduce oil production. The additive may be supplied continuously to the steam chamber, along with the steam and optionally the light solvent, or periodically as needed to maintain desired heavy oil production rates. In one embodiment, the additive is supplied to the steam chamber at a rate in a range from 0.01-30 wt. % of the injected fluids, based on the injection rate of steam, light solvent and additive. In another embodiment, the injected fluid includes from 0.01-10 wt. % additive. More or less additive may be supplied in response to changes in heavy oil production rates.

In one embodiment, the additive is added to the steam and injected into the steam chamber from the injection tubing. The additive may be combined with the steam at or upstream of the wellhead, or below the wellhead within the injection tubing. The additive may be preheated prior to combining with the steam, or heat energy may be provided by the steam. Alternatively, the additive may be supplied to the steam chamber using a second injection tubing apart from steam injection, the separate tubing inserted into the wellbore and extending alongside the injection tubing to the steam chamber. Mixing may occur in the injection tubing and in the steam chamber. A conformance device may be used to facilitate mixing and distribution into the steam chamber. Sufficient additive is supplied to the steam chamber to maintain a liquid level above the production tubing in the near wellbore region of the steam chamber. Alternatively, sufficient additive is supplied to mobilize asphaltenes in the near wellbore region, and to blend with heavy oil being produced from the chamber such that asphaltenes in the heavy oil remain in solution during production. Conditions during additive addition are such that less than 10 wt. % of the additive vaporizes at steam chamber conditions.

Additive may be supplied to the reservoir in combination with light solvent. Alternatively, light solvent in the injection stream may be replaced with the additive, and the additive, in combination with the steam, injected into the steam chamber. Flow of steam to the steam chamber may be stopped for a period during which time the additive is injected into the reservoir. Steam may be injected in combination with the vapor phase light solvent at a first steam rate for a first period of time, and steam (optionally in combination with light solvent) injected along with the liquid additive at a second steam rate for a second period of time, wherein the second steam rate is less than 90 wt. %, or less than 80 wt. %, of the first steam rate. Liquid phase additive, whether in combination with steam and/or light solvent, may be injected through the injection tubing and produced through the production tubing over a period of time needed to remove asphaltenes from the near wellbore region. The period of time needed to inject the additive may be determined by the modified pressure differential between the injection tubing and the production tubing. Alternatively, the asphaltene content of the produced asphaltene-containing additive may be analyzed to determine when sufficient asphaltenes have been removed.

Producing Upgraded Heavy Oil: During production of upgraded heavy oil, steam and light solvent are injected into the steam chamber over a period that may extend from days (e.g. 10 days) to months (e.g. 5 months), during which time upgraded heavy oil is produced from the expanding steam chamber and asphaltenes are deposited in the steam chamber. The produced fluids from the steam chamber may include one or more of heavy oil, upgraded heavy oil, liquid water from steam injection or from formation water, liquid phase light solvent as a separate phase or as dissolved in the upgraded heavy oil, and asphaltene-enriched additive as a separate phase or as dissolved in the upgraded heavy oil. The produced fluids may also include some amount of entrained solids.

Production conditions are controlled during this stage to retain the asphaltenes in the production fluids. Often the concentration of asphaltenes will not be sufficiently high to cause their premature precipitation. In other situations, the produced fluids that are enriched in asphaltenes may be treated to separate the asphaltenes from the remainder of the production fluids. These treatment options permit handling and transportation of the remaining production fluids with little or no risk of asphaltene precipitation. Processing steps for removing asphaltenes from production fluids may include, for example, deasphalting using a light solvent such as pentane or propane. Alternatively, the produced oil may be mixed with a diluent and transported from the production site without separating the asphaltenes from the oil. The diluent may have similar properties as the additive; and alternate diluent is more volatile than the additive. Produced fluids recovered through the production tubing may be further processed prior to shipping and/or refining. Example processing includes one or more of dewatering, desalting, and stabilization to remove light products.

Light solvent may be recovered from the produced fluid mixture by a stabilization step, which may include fractional distillation, with recovered light solvent optionally being recycled to the reservoir. Base fluid in the additive may also be recovered and optionally recycled using a fractional distillation process.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred to herein are expressly incorporated herein by reference.

What is claimed is:

1. A method for enhancing oil recovery, comprising:
providing a subterranean reservoir containing heavy oil;
providing a production wellbore containing a production tubing and an injection wellbore spaced-apart from the production wellbore at a predetermined elevation and containing an injection tubing;
injecting steam into the subterranean reservoir and generating a steam chamber in the reservoir to form a near wellbore region in the steam chamber close to the injection tubing and the production tubing, a far wellbore region in the steam chamber distant from the injection tubing and the production tubing, and a condensing region along a perimeter of the steam chamber, such that the injection tubing is in fluid communication with the production tubing within the steam chamber and producing a first heavy oil having a first asphaltene content;
injecting a vapor phase light solvent and additional steam into the steam chamber at a predetermined steam injection temperature and at a predetermined steam injection pressure and producing a second heavy oil having a second asphaltene content, wherein the second heavy oil is produced in response to the light solvent and the additional steam interacting with the heavy oil in the condensing region and causing asphaltenes in the heavy oil to precipitate and remain in the steam chamber; and
injecting a liquid phase additive to the near wellbore region of the steam chamber for mobilizing asphaltenes in the near wellbore region of the steam chamber to remove the asphaltenes from the near wellbore region of the steam chamber for maintaining production of the second heavy oil;
wherein the liquid phase additive has an initial boiling point that is higher than the predetermined steam injection temperature at the predetermined steam injection pressure;
wherein at least 90 wt. % of the additive remains in the liquid phase in the steam chamber at the predetermined steam injection pressure and the predetermined steam injection temperature; and
wherein the second heavy oil is an upgraded heavy oil, and wherein the second asphaltene content of the second heavy oil is less than 95 wt. % of the first asphaltene content of the first heavy oil.

2. The method of claim 1, wherein the step of generating the steam chamber comprises injecting the steam into the subterranean reservoir from both the injection tubing and the production tubing.

3. The method of claim 1, wherein the first asphaltene content of the first heavy oil is greater than 5%.

4. The method of claim 1, wherein the second heavy oil has an API gravity that is at least 2 API numbers higher than the API gravity of the first heavy oil.

5. The method of claim 1, wherein the steam injection temperature is in a range from 150°-400° C. and the steam injection pressure is in a range 350-14,000 kPa.

6. The method of claim 1, wherein the light solvent comprises at least 80 wt. % C3-C5 hydrocarbons.

7. The method of claim 1, wherein the additional steam and the light solvent are supplied to the steam chamber using a first injection tubing, and the liquid phase additive is supplied to the near wellbore region of the steam chamber using a second injection tubing.

8. The method of claim 1, further comprising producing the second heavy oil, liquid water, light solvent and asphaltene-enriched additive from the steam chamber.

9. The method of claim 1, further comprising:
injecting the additional steam and the vapor phase light solvent into the steam chamber at the predetermined steam injection temperature and the predetermined steam injection pressure to maintain the additional steam and the light solvent as vapors; and producing the second heavy oil from the reservoir; and
continuing to inject the additional steam and the liquid phase additive, without additional injection of the light solvent, into the steam chamber at conditions sufficient to maintain the additive as a liquid and for a time sufficient to increase production rate of the second heavy oil from the reservoir.

10. The method of claim 9, further comprising injecting the additional steam and the vapor phase light solvent at a first steam rate, and thereafter injecting the additional steam in combination with the liquid phase additive at a second steam rate, wherein the second steam rate is less than the first steam rate.

11. The method of claim 1, wherein the liquid phase additive is injected into the steam chamber at a temperature in a range from 150°-400° C. and at a pressure in a range from 350-14,000 kPa.

12. The method of claim 1, further comprising determining a base pressure differential between the injection tubing and the production tubing before provision of the liquid phase additive to the steam chamber, and providing the liquid phase additive to the steam chamber at a rate sufficient to maintain a pressure differential between the injection tubing and the production tubing of less than 1000 kPa higher than the base pressure differential.

13. The method of claim 1, wherein the liquid phase additive comprises a base fluid and at least one dispersing agent.

14. The method of claim 13, wherein the base fluid is selected from the group consisting of a jet fuel boiling range fraction and a diesel fuel boiling range fraction.

15. The method of claim 13, wherein the base fluid comprises in a range from 60-100 wt. % aromatics.

16. The method of claim 13, wherein the liquid phase additive comprises an average dispersing agent content of 1-30,000 ppm.

17. The method of claim 13, wherein the at least one dispersing agent is selected from the group consisting of polyolefin amides, alkyl magnesium sulfonates, succinylamines with alkyl and aryl substituents, alkyl aryl phosphonic acids, alkylated polycondensed aromatics, alkylaromatics, alkylaryl sulfonic acids, phosphoric esters, phosphonocarboxylic acids, sarcosinates, ethercarboxylic acids, aminoalkylenecarboxylic acids, alkylphenols, ethoxylates of alkylphenol s, imidazolines, alkylamide-imidazolines, alkylsuccinimides, alkylpyrrolidones, fatty acid amides, ethoxylates of fatty acid amides, fatty esters of polyhydric alcohols, ion-pair salts of imines and organic acids, and ionic liquids.

18. The method of claim 1, wherein the liquid phase additive provides a liquid level in the near wellbore region for maintaining production of the second heavy oil.

* * * * *